US012636530B2

(12) United States Patent
Noori et al.

(10) Patent No.: US 12,636,530 B2
(45) Date of Patent: May 26, 2026

(54) SYSTEMS, METHODS, AND DEVICES FOR EARLY WILDFIRE DETECTION AND PREDICTION

(71) Applicant: SenseNet Inc., Vancouver (CA)

(72) Inventors: Hamed Noori, Vancouver (CA); Shahab Bahrami, Vancouver (CA)

(73) Assignee: SenseNet Inc., Vancouver (CA)

( * ) Notice: Subject to any disclaimer, the term of this patent is extended or adjusted under 35 U.S.C. 154(b) by 476 days.

(21) Appl. No.: 18/304,156

(22) Filed: Apr. 20, 2023

(65) Prior Publication Data

US 2023/0338760 A1      Oct. 26, 2023

Related U.S. Application Data

(60) Provisional application No. 63/333,096, filed on Apr. 20, 2022.

(51) Int. Cl.
*A62C 3/02*          (2006.01)
*H04W 4/38*          (2018.01)
*G08B 17/00*          (2006.01)
*G08B 25/10*          (2006.01)
*G08B 31/00*          (2006.01)

(52) U.S. Cl.
CPC .............. *A62C 3/0271* (2013.01); *H04W 4/38* (2018.02); *G08B 17/005* (2013.01); *G08B 25/10* (2013.01); *G08B 31/00* (2013.01)

(58) Field of Classification Search
USPC .......................................................... 702/3
See application file for complete search history.

(56) References Cited

U.S. PATENT DOCUMENTS

| | | |
|---|---|---|
| 10,957,185 B2 | 3/2021 | Krstanovic et al. |
| 10,964,201 B1 | 3/2021 | Ton-That et al. |
| 11,295,131 B1 | 4/2022 | Dhawan et al. |

(Continued)

FOREIGN PATENT DOCUMENTS

| | | |
|---|---|---|
| CN | 106781178 A | 5/2017 |
| EP | 2511888 B1 | 12/2018 |

(Continued)

OTHER PUBLICATIONS

"Optical Bandpass Filter Fundamentals", posted on Aug. 15, 2020 at (Year: 2020).

(Continued)

*Primary Examiner* — Paul D Lee
(74) *Attorney, Agent, or Firm* — Own Innovation; Daniel Biggs; James W. Hinton

(57)          ABSTRACT

A detection and prediction system, method, and server are provided. The system includes data collecting devices configured to connect to a network and a server for receiving environmental data from the devices, the data including location data, historical environmental data, and real-time environmental data, populating a map of a geographic area where the devices are disposed, receiving weather data through the wildfire detection network, determining a probability of a wildfire at a plurality of locations within the geographic area from the environmental data and the weather data, and determining whether an anomaly has occurred within the geographic area based on the real-time environmental data.

16 Claims, 8 Drawing Sheets

(56)  References Cited

U.S. PATENT DOCUMENTS

| | | | |
|---|---|---|---|
| 11,521,479 | B2 | 12/2022 | Shah et al. |
| 11,627,436 | B2 | 4/2023 | Volkerink et al. |
| 2006/0176169 | A1 | 8/2006 | Doolin et al. |
| 2013/0219046 | A1 | 8/2013 | Wetterwald et al. |
| 2016/0132714 | A1 | 5/2016 | Pennypacker et al. |
| 2017/0100615 | A1 | 4/2017 | Doten |
| 2018/0184360 | A1 | 6/2018 | Cavalcanti et al. |
| 2018/0199172 | A1 | 7/2018 | Boily et al. |
| 2019/0104519 | A1 | 4/2019 | Sydir et al. |
| 2019/0176987 | A1 | 6/2019 | Beecham |
| 2019/0277822 | A1* | 9/2019 | Chadha ............... G01N 33/0031 |
| 2020/0187488 | A1* | 6/2020 | Holmberg ........... A01M 31/004 |
| 2020/0236607 | A1 | 7/2020 | Zhu et al. |
| 2020/0242916 | A1* | 7/2020 | Krstanovic ........ G08B 21/0453 |
| 2020/0348446 | A1 | 11/2020 | Tremsin |
| 2021/0097850 | A1* | 4/2021 | Ton-That .............. G06F 16/587 |
| 2021/0337425 | A1 | 10/2021 | Wintner et al. |
| 2022/0161075 | A1* | 5/2022 | Snook ................... G08B 17/005 |
| 2022/0276080 | A1* | 9/2022 | Deutsch ................ G01D 21/02 |
| 2023/0011424 | A1 | 1/2023 | Kereszy et al. |

FOREIGN PATENT DOCUMENTS

| | | |
|---|---|---|
| WO | 2016132161 A1 | 8/2016 |
| WO | 2019048604 A1 | 3/2019 |
| WO | 2021194849 A1 | 9/2021 |
| WO | 2023023829 A1 | 3/2023 |

OTHER PUBLICATIONS

Distefano et al.' "A hypervisor for infrastructure-enabled sensing Cloud", 2013.

Sferopoulos, "A Review of Chemical Warfare Agent (CWA) Detector Technologies and Commercial-Off-The-Shelf Items", published Mar. 2009.

United States Patent and Trademark Office, Examiner's Report for U.S. Appl. No. 18/304,139, filed Feb. 15, 2024.

United States Patent and Trademark Office, Examiner's Report for U.S. Appl. No. 18/304,139, filed Jun. 26, 2024.

United States Patent and Trademark Office, Examiner's Report for U.S. Appl. No. 18/304,139, filed Oct. 17, 2024.

International Search Report from corresponding PCT application No. PCT/CA2023/050540.

* cited by examiner

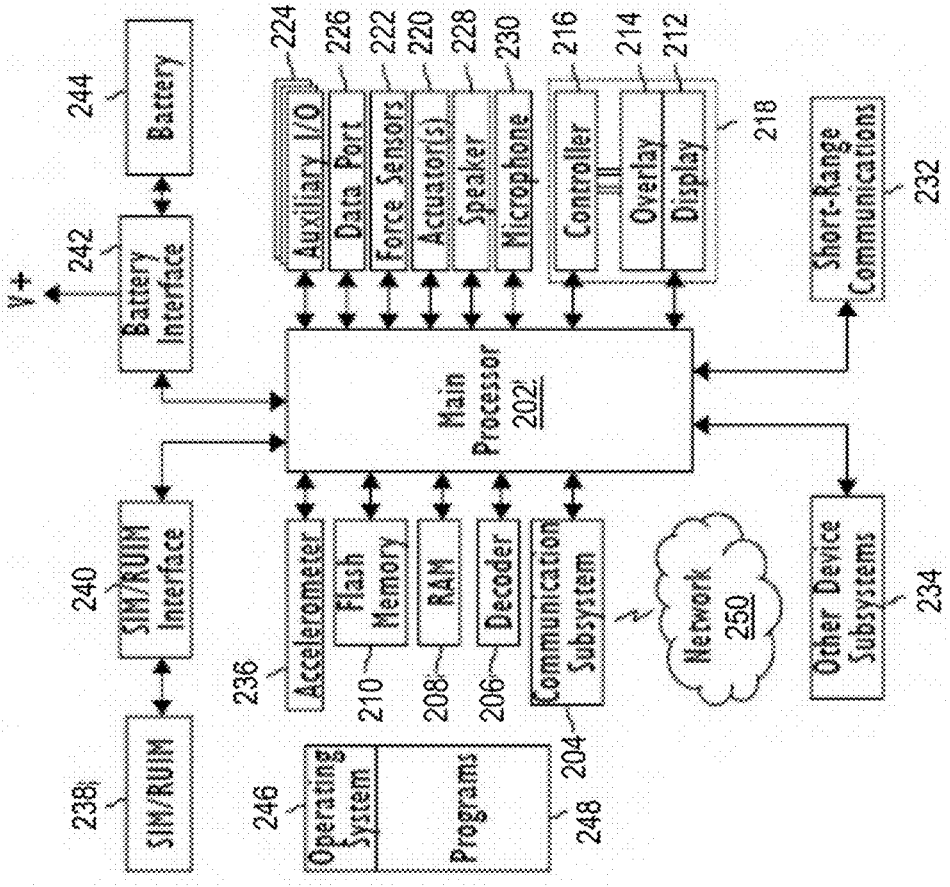
Figure 2

400

402
Collecting environmental data from a data processing device connected to a wireless network 404
Receiving additional data from another data collection device 406
Merging the additional data with the environmental data to form merged data 408
Transmitting the merged data over the wireless network

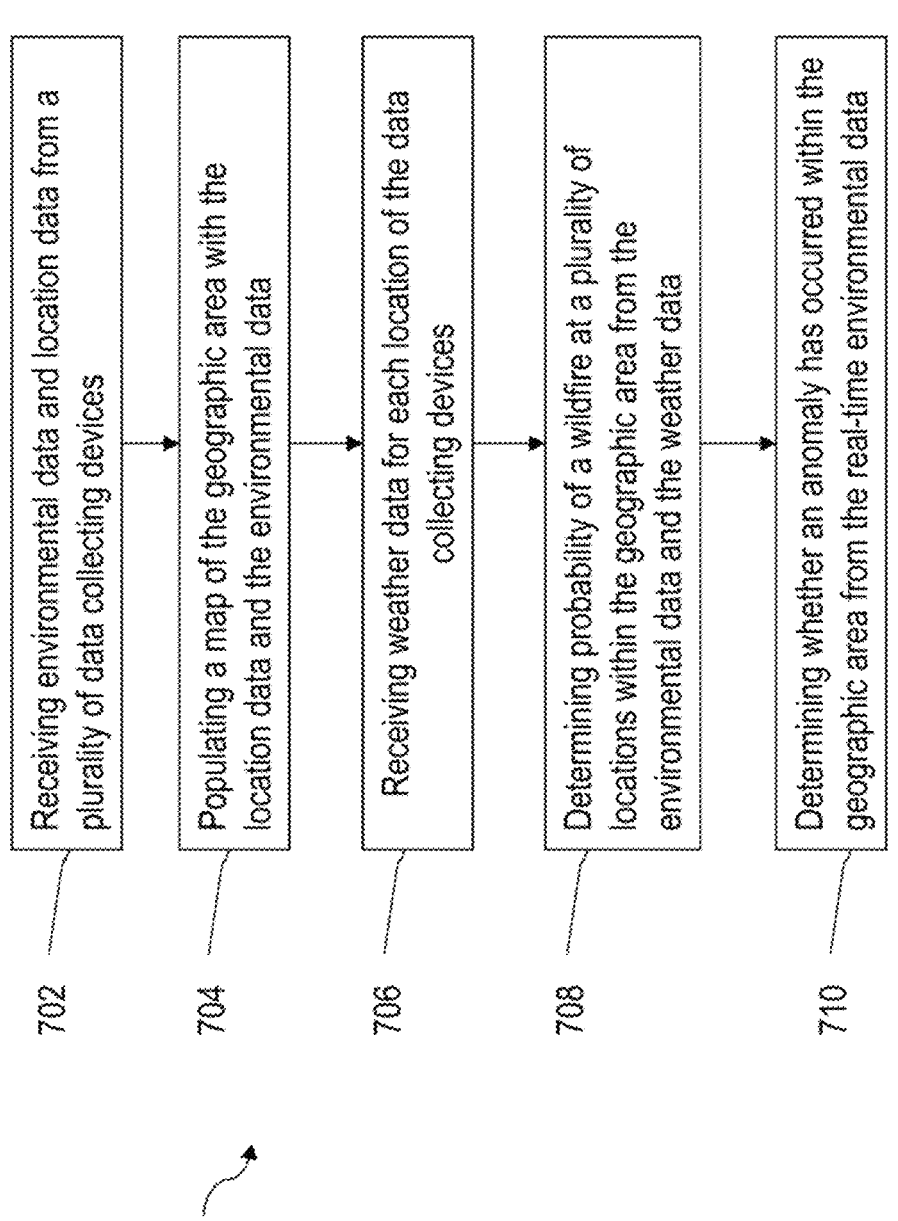

702 Receiving environmental data and location data from a plurality of data collecting devices 704 Populating a map of the geographic area with the location data and the environmental data 706 Receiving weather data for each location of the data collecting devices 708 Determining probability of a wildfire at a plurality of locations within the geographic area from the environmental data and the weather data 710 Determining whether an anomaly has occurred within the geographic area from the real-time environmental data

SYSTEMS, METHODS, AND DEVICES FOR EARLY WILDFIRE DETECTION AND PREDICTION

TECHNICAL FIELD

The following relates generally to wildfire detection, and more particularly to systems, methods, and devices for early detection, monitoring, and prediction of wildfires.

INTRODUCTION

Wildfires pose numerous dangers to human life, to the environment, and to property. Wildfires may be deadly for both humans and animals alike. Wildfires present particular risks of people becoming trapped by rapidly moving flames or succumbing to smoke inhalation and wildlife not being able to escape or find suitable habitats thereafter. Wildfires may cause extensive damage to residential and commercial properties, infrastructure, and agricultural lands, resulting in significant financial losses for individuals, businesses, and governments.

Significant environmental devastation may also result from wildfires. Such devastation includes damage to forests, grasslands, and other ecosystems due to the loss of vegetation. Such loss of vegetation leads to soil erosion, reduced water quality, and an increased risk for landslides and flooding in affected areas. Smoke from wildfires may significantly reduce air quality, leading to respiratory problems and other health concerns for people and animals alike. Fine particulate matter (PM2.5) and other pollutants are able to travel long distances, impacting air quality even far away from where wildfires have occurred. Furthermore, wildfires release large amounts of carbon dioxide ($CO_2$) and other greenhouse gases into the atmosphere, contributing to climate change.

Early wildfire detection is essential as a means of preserving human life and protecting the environment by allowing for quicker responses and better management of wildfires. Early detection of wildfires allows firefighting crews to act more quickly, potentially responding to a wildfire before the wildfire spreads out of control. Such response helps minimize overall damage to human life, to the environment, and to property. Furthermore, firefighting authorities may be able to allocate resources more effectively to where they are most needed. Such allocation may result in a more efficient use of personnel, equipment and financial resources and may help preserve human life.

Fighting wildfires before they spread may advantageously help defray overall firefighting expenses, as smaller fires tend to be less expensive and resource-intensive to extinguish than larger, out-of-control wildfires. When wildfires are detected early, authorities have more time to issue evacuation orders and guarantee residents in affected areas are safely evacuated. This additional time advantageously mitigates injuries and fatalities by giving people enough time to prepare and leave their homes safely. Furthermore, early detection allows for faster alerts about air quality and smoke-related health hazards. Such faster alerts may help individuals with respiratory conditions such as asthma or other lung diseases take precautions and minimize exposure to hazardous pollutants. Moreover, early detection may facilitate protecting critical infrastructure such as power lines, roads, and communication networks, decreasing the likelihood of widespread service disruptions and repairs that would incur costs. Early detection may further lead to faster containment, advantageously minimizing the environmental effects of wildfires such as soil erosion, water pollution, and loss of biodiversity.

A variety of wildfire detection systems are known and utilized to detect and monitor wildfires. Presently, networks of ground-based sensors installed in fire-prone areas may detect changes in smoke or temperature indicators that might indicate the presence of a fire. Known ground-based sensors for stationary wildfire surveillance systems have limitations including limited coverage for star topologies, significant power consumption, and limited scalability. Expanding the coverage of stationary systems, particularly of star topologies, can be costly and time-consuming, as such expansion requires the installation of additional sensors, cameras, or towers. Furthermore, stationary systems may have difficulty detecting fires with certain characteristics, such as low-intensity fires, fires beneath tree canopies, or fires in areas with highly variable temperatures.

Moreover, the network protocols and sensor topologies used by known ground-based sensors, such as star topologies, consume significant power, thereby leading to costly maintenance. Network protocols such as Wi-Fi™, Bluetooth™ 3G/4G/5G Cellular Networks, and Ethernet™ consume high power due to higher transmission power and complex protocol overhead.

For ground-based sensors, star or mesh network topologies may be used. In a star network topology, all nodes (devices) are connected to a central hub or switch. The central hub manages the connections and communication between nodes. Data transmitted by a node must pass through the central hub or switch before reaching its destination. However, dependence on the central hub adds limitations to the star network topology. The limitations include reduced scalability, higher failure risk to the network if the central hub fails, i.e., a single point of failure, and higher cost. Comparatively, in the mesh network topology, the nodes are interconnected, with each node potentially having multiple connections to other nodes. Data may be transmitted along multiple paths, providing redundancy and fault tolerance. However, known systems for wildfire detection organized according to a mesh topology consume significant power as the antenna of each sensor stays active a large number of connections between nodes.

Satellites, aerial imaging methods, and stationary surveillance methods may be used to scan very large areas of land but may not detect flames at early stages unless in a direct line of sight and may not be able to recognize early-stage wildfires at all. In particular, satellite-based systems for wildfire detection rely on orbits of satellites for coverage, which may cause gaps in coverage or delays in data acquisition for certain areas. Moreover, aerial systems relying on flying vehicles, such as drones, may be temporally limited, as drones and like devices have limited flight durations.

Wildfire prediction plays a crucial role in wildfire management and mitigation. Accurate and timely predictions help save lives, property, and natural resources. They enable better resource allocation, early warnings, and more effective firefighting strategies. However, many wildfire prediction systems depend on historical data, which may not accurately represent the current conditions on the ground. The absence of real-time monitoring makes it difficult to quickly adapt to changing conditions and make accurate predictions. Furthermore, traditional models are deficient in providing detailed, high-resolution information about specific locations. This can make it difficult to identify high-risk areas and plan targeted interventions.

Accordingly, networks, methods, and devices are desired that overcome one or more disadvantages associated with existing wildfire detection, monitoring, and prediction systems.

SUMMARY

A detection and prediction system is provided. The system includes a plurality of data collecting devices configured to connect to a wildfire detection network and a network server for receiving environmental data from the plurality of data collecting devices, the environmental data including location data, historical environmental data, and real-time environmental data, populating a map of a geographic area in which the plurality of data collecting devices are disposed, receiving weather data through the wildfire detection network, determining a probability of a wildfire at a plurality of locations within the geographic area from the environmental data and the weather data, and determining whether an anomaly has occurred within the geographic area based on the real-time environmental data.

The data collecting device may include a sensor assembly. The sensor assembly may include a plurality of sensors configured to detect the environmental data, the environmental data relating to any one or more of carbon dioxide, carbon monoxide, nitrogen dioxide, temperature, and humidity. The sensor assembly may include a filter configured to improve measurement accuracy, the filter configured as any one or more of a bandpass filter, a neutral density filter, a chemical filter, and a particulate filter. The weather data may include at least one of wind data, temperature data, precipitation data, and sunshine intensity data.

The environmental data and the weather data may be processed according to an algorithm implemented in a graph neural network, the graph neural network including a historical data processing layer, a real-time data processing layer, an external data processing layer, and a multivariate mapping and anomaly detection layer.

The network server may further be configured to receive vegetation data and fire history data over the network and combine the historical environmental data, the location data, the weather data, the vegetation data, and the fire history data to determine the probability of the wildfire for the plurality of locations within the geographic area.

The network server may further be configured to divide the map into smaller portions to form a pixelated map, aggregate sensor data from the environmental data and the location data, populate the pixelated map with the sensor data, the sensor data for the plurality of sensors correlated to the location of the sensors within the plurality of sensors, and determine the probability of the wildfire at the location corresponding to a pixel within the pixelated map.

The data collecting device may automatically select a network protocol from a plurality of network protocols based on a location of the data collecting device and/or a received network protocol received from another data collecting device.

The system may further include at least one network gateway configured to provide a communication interoperability interface between the plurality of network protocols and a network server for providing network services including data processing, storage, application and device management, and resource sharing, the network server connected to the at least one network gateway. The plurality of network protocols may include any one or more of a LoRa (Long Range) network protocol and a LoRaWAN (Long Range Wide Area Network) network protocol. The environmental data may relate to the presence or absence of a wildfire.

The plurality of data collecting devices and the at least one network gateway may be configured to transmit data in a time synchronization, the time synchronization including any one or more of duty cycling, time-slotted communication, coordinated sensing, power-efficient routing, and reduced idle listening.

The data collecting device may include a wireless communication module, the wireless communication module configured to operate in any one of a plurality of operation modes including a LoRa end-node, a LoRaWAN end-node, a LoRa repeater mode, and a LoRa to LoRaWAN mode based on the received network protocol of the other data collecting device.

The data collecting device may include a power supply assembly configured to provide electrical power to the data collecting device, the power supply assembly including a power source and a power management circuit. The power source may include a rechargeable battery and a non-rechargeable battery. The rechargeable battery may serve as a first power source until an energy level of the rechargeable battery reaches a predetermined limit according to the power management circuit, and the non-rechargeable battery may serve as a second power source when the energy level is at the predetermined limit.

A detection and prediction method is provided. The method includes receiving environmental data from a plurality of data collecting devices configured to connect to a wildfire detection network, the environmental data including location data, historical environmental data, and real-time environmental data, populating a map of a geographic area in which the plurality of data collecting devices are disposed, receiving weather data from the wildfire detection network, determining a probability of a wildfire at a plurality of locations within the geographic area from the environmental data and the weather data, and determining whether an anomaly has occurred within the geographic area from the real-time environmental data.

The data collecting device may include a sensor assembly, the sensor assembly including a plurality of sensors configured to detect the environmental data, the environmental data relating to any one or more of carbon dioxide, carbon monoxide, nitrogen dioxide, temperature, and humidity. The sensor assembly may include a filter configured to improve measurement accuracy, the filter configured as any one or more of a bandpass filter, a neutral density filter, a chemical filter, and a particulate filter. The weather data may include at least one of wind data, temperature data, precipitation data, and sunshine intensity data.

The environmental data and the weather data may be processed according to an algorithm implemented in a graph neural network, the graph neural network including a historical data processing layer, a real-time data processing layer, an external data processing layer, and a multivariate mapping and anomaly detection layer.

The method may further include receiving vegetation data and fire history data over the network and combining the historical environmental data, the location data, the weather data, the vegetation data, and the fire history data to determine the probability of the wildfire for the plurality of locations within the geographic area.

The method may further include dividing the map into smaller portions to form a pixelated map, aggregating sensor data from the environmental data and the location data, populating the pixelated map with the sensor data, wherein the sensor data for the plurality of sensors is correlated to the location of the sensors within the plurality of sensors and determining the probability of the wildfire at the location corresponding to a pixel within the pixelated map.

The method may further include selecting automatically, by the data collecting device, a network protocol from a plurality of network protocols based on a location of the data collecting device and/or a received network protocol received from another data collecting device.

The method may further include transmitting data in a time synchronization, the time synchronization including any one or more of duty cycling, time-slotted communication, coordinated sensing, power-efficient routing, and reduced idle listening.

The plurality of network protocols may include any one or more of a LoRa (Long Range) network protocol and a LoRaWAN (Long Range Wide Area Network) network protocol. The environmental data may relate to the presence or absence of a wildfire. The data collecting device may include a wireless communication module. The wireless communication module may be configured to operate in any one of a plurality of operation modes including a LoRa end-node, a LoRaWAN end-node, a LoRa repeater mode, and a LoRa to LoRaWAN mode based on the received network protocol of the other data collecting device.

The data collecting device may include a power supply assembly configured to provide electrical power to the data collecting device, the power supply assembly including a power source and a power management circuit. The power source may include a rechargeable battery and a non-rechargeable battery. The rechargeable battery may serve as a first power source until an energy level of the rechargeable battery reaches a predetermined limit according to the power management circuit, and the non-rechargeable battery may serve as a second power source when the energy level is at the predetermined limit.

A network server is provided. The network server is for receiving environmental data from a plurality of data collecting devices configured to connect to a wildfire detection network, the environmental data including location data, historical environmental data, and real-time environmental data, populating a map of a geographic area in which the plurality of data collecting devices are disposed, receiving weather data through the wildfire detection network, determining a probability of a wildfire at a plurality of locations within the geographic area from the environmental data and the weather data, and determining whether an anomaly has occurred within the geographic area based on the real-time environmental data.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of systems, methods, and devices of the present specification. In the drawings:

FIG. 2 is a simplified block diagram of components of a device, according to an embodiment;

FIG. 7 is a flow diagram of a method for wildfire detection and prediction, according to an embodiment.

DETAILED DESCRIPTION

Figure 1:
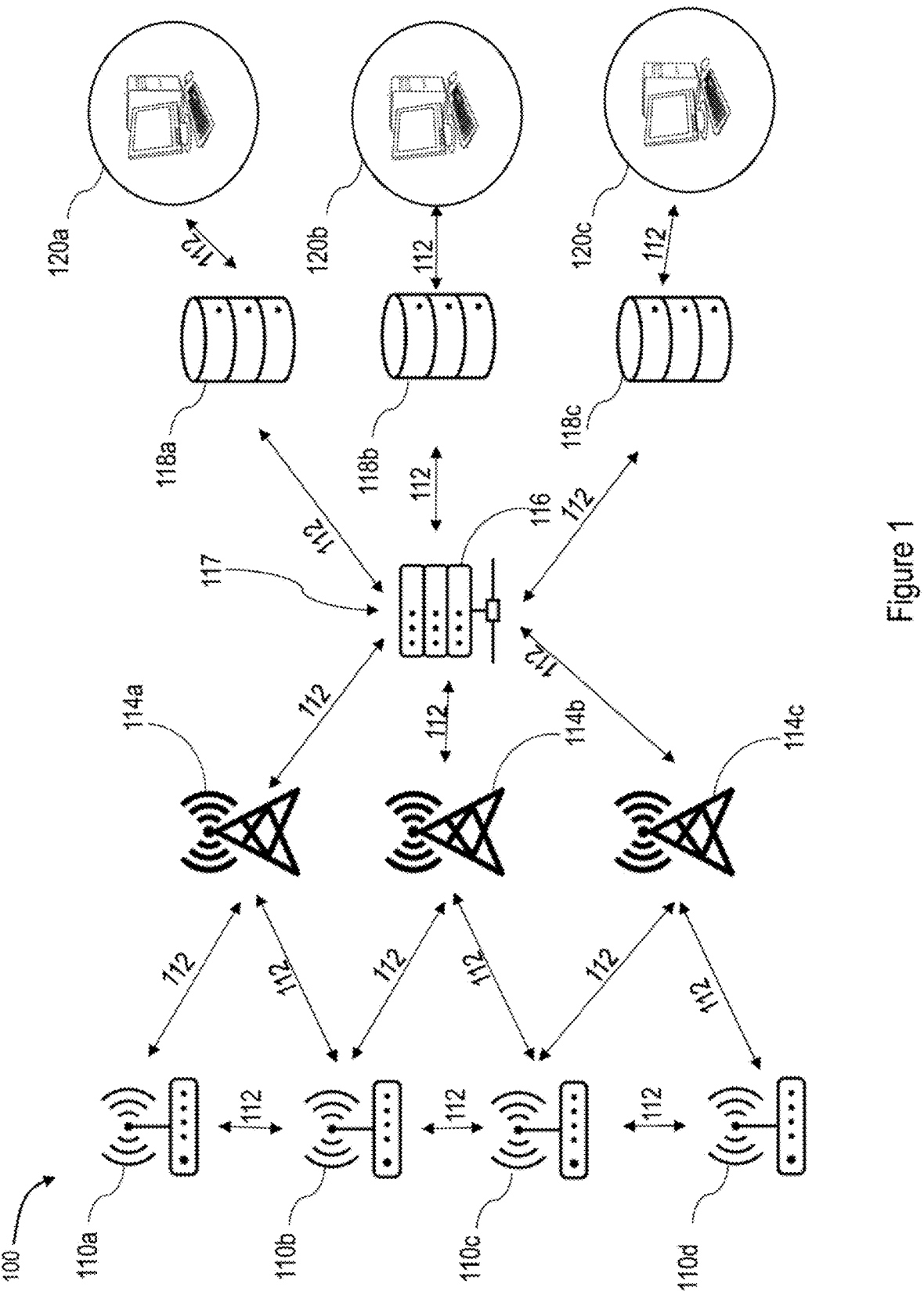
FIG. 1 is a schematic diagram illustrating a system for early detection and monitoring of wildfires, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, personal computer, cloud-based program or system, laptop, personal data assistant, cellular telephone, smartphone, or tablet device.

Each program is preferably implemented in a high-level procedural or object-oriented programming and/or scripting language to communicate with a computer system. However, the programs may be implemented in assembly or machine language, if desired. In any case, the language may be a compiled or interpreted language. Each such computer program is preferably stored on a storage medium or a device readable by a general- or special-purpose programmable computer for configuring and operating the computer when the storage medium or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms, or the like may be described (in the disclosure and/or in the claims) in a sequential order, such processes, methods, and algorithms may be configured to work in alternate orders. Accordingly, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device or article (whether or not they cooperate) may be used in place of a single device or article. Similarly, where more than one device or article is described herein (whether or not they cooperate), it will be readily apparent that a single device or article may be used in place of the more than one device or article.

The following relates generally to wildfire detection, and more particularly to systems, methods, and devices for early detection and monitoring of wildfires.

Wildfire detection systems are essential tools for forest and wildlife management agencies. Early detection and containment of wildfires advantageously minimizes damage to ecosystems and protects endangered species. Early wildfire detection systems are designed to identify and pinpoint the location of wildfires in their early stages, before wildfires become too large and uncontrollable. By recognizing wildfires at an early stage, early wildfire detection systems provide invaluable data to firefighters and emergency response units so that they can act swiftly and decisively.

Early detection of wildfires also helps maximize resource allocation for firefighting operations, enabling authorities to prioritize their response and deploy personnel and equipment strategically. Such allocation ensures that efforts are focused on the most critical areas, preventing the spread of wildfires and minimizing overall costs associated with suppression efforts.

Furthermore, early wildfire detection systems are essential in safeguarding public health by issuing timely alerts about air quality and smoke-related health hazards. This information allows those with respiratory conditions to take necessary precautions to reduce their exposure to hazardous air pollutants. Moreover, these systems provide invaluable data to researchers and fire management agencies to better comprehend wildfire behavior, create more efficient firefighting tactics, and enhancing prevention measures. As such, early wildfire detection systems play a pivotal role in helping minimize damage caused by wildfires while safeguarding environments, communities, and vital infrastructure for present and future generations. Paramount among the advantages of early wildfire detection systems, methods, and devices according to the present invention is the increased preservation of human life.

Wildfire prediction often relies on historical data, which may not accurately represent the current conditions. Artificial intelligence models may be employed to process real-time data from various sources, such as satellite imagery, weather stations, and social media, to provide more accurate and timely predictions. Further, artificial intelligence techniques, such as machine learning and deep learning, may help improve the spatial resolution of these models by processing high-resolution satellite imagery and other datasets.

A machine learning apparatus for predicting whether wildfires may occur in a geographic area is provided. In an embodiment, a plurality of data collecting devices connect to a wildfire prediction network. The plurality of data collecting devices include a plurality of sensors for collecting environmental data. A wildfire prediction server receives the environmental data, which includes historical environmental data and real-time environmental data and location data correlating to the location of each of the plurality of data collecting devices from the plurality of data collecting devices over the network. The server includes memory having computer readable instructions thereon and a processor for executing the computer readable instructions. The environmental data and the location data are collected from the plurality of data collecting devices over the network. A map of the geographic area is populated with the location data and the environmental data. Weather data is received over the network. The probability that a wildfire may occur is determined at a plurality of locations within the geographic area from the historical environmental data, the location data, and the weather data. Whether an anomaly has occurred is determined at each of the plurality of locations within the geographic area from the real-time environmental data. Output related to at least one location on the map regarding the probability of the wildfire and/or whether an anomaly has occurred is generated.

A hybrid real-time, stream, and batch machine learning system for wildfire detection and prediction is provided. In an embodiment, the system includes collecting environmental and wildfire data from multiple sources, including third-party historical data, sensor data, and location data from data collecting devices, and other wildfire related data. A plurality of data collecting devices connected to the wildfire detection and prediction network may be provided, each device including a plurality of sensors for collecting environmental data. A server configured to receive historical environmental data, real-time environmental data, location data, and other related data from the data collecting devices may be provided.

The server may include memory having computer readable instructions thereon and a processor for executing the computer readable instructions. The instructions when executed may cause the processor to determine the probability of a wildfire at a location based on the historical environmental data, the sensor location data, and the weather data.

An algorithm may be employed to collect and analyze the historical environmental data, sensor location data, weather data, and related data. The algorithm may have multiple layers of processing including a historical data processing layer, a real-time data processing layer, and a multivariate mapping and anomaly detection layer. The algorithm may be integrated with artificial intelligence and machine learning systems configured for ultra-early wildfire detection, fire danger predictions, and fire location probability determination. The determination may be through calculation.

The instructions when executed may further cause the processor to populate a map for a geographic area with the location data and the environmental data and determine the wildfire probability for each location within the geographic area. The map may be populated in a two-dimensional (2D) environment and may be divided into small portions to generate a pixelated map. The pixelated map may aggregate environmental data and sensor values collected by the device corresponding to a position on the pixelated map.

The instructions when executed may further cause the processor to determine whether an anomaly has occurred at each of the plurality of locations within the geographic area based on the real-time environmental data received from the devices. This includes determining the probability that a wildfire will occur at a location. The anomaly may be determined using the real-time data processing layer and the anomaly detection layer on the server.

The instructions when executed may further cause the processor to generate a result as to whether an anomaly has occurred and the probability of wildfire. The result may be communicated to a display device.

The real-time environmental data and the location data are collected from the plurality of data collecting devices over the network. A map of the geographic area is populated with the location data and the environmental data. Furthermore, weather data is received over the network.

To predict wildfires, the server may obtain and analyze weather data, vegetation data, fire history data, and other relevant data from a third-party server over a network. The server may determine the probability of a wildfire based on the data received from the third-party server and data received from the data collecting devices.

The server may also obtain and analyze sensor data, sensor data patterns, sensor data relationships, real-time data, and historical data. The server may also obtain data from the data collecting devices. The weather data may include wind data, temperature data, precipitation data, sunshine intensity data, and similar data.

The server may collect absolute values for a location based on the corresponding sensor data. For the neighbouring locations on a pixelated map, the server may estimate values of the neighbouring locations based on the absolute values of a primary location. This technique may be used to generate estimates of sensor values for the whole map.

The system network may be deployed on a cloud computing architecture to monitor environmental data. The server may be a cloud server connected to a wide area network. The cloud server may include different layers for different purposes. The different layers may include a hardware layer and/or a platform layer. The system network may be configured to connect to and supervise various virtual machines and client systems. The cloud architecture may be configured to provide dedicated services such as platform as a service (PaaS), software as a service (SaaS), and infrastructure as a service (IaaS).

Referring now to FIG. 1, shown therein is a schematic diagram illustrating a system 100 for early detection and monitoring of wildfires, according to an embodiment.

The system 100 includes a plurality of data collecting devices 110a, 110b, 110c, and 110d (collectively referred to as the data collecting devices 110 and generically referred to as the data collecting device 110), a network 112 to provide communication between the components of the system 100, a plurality of network gateways 114a, 114b, 114c (collectively referred to as the network gateways 114 and generically referred to as the network gateway 114) to provide an interface and network services between different network protocols and technologies, a network server 116 to provide network services including data processing, storage, application and device management, and resource sharing, a plurality of application servers or third-party servers 118a, 118b, 118c (collectively referred to as the application servers or the third-party servers 118 and generically referred to as the application server or the third-party server 118), a plurality of terminals 120a, 120b, 120c (collectively referred to as the terminals 120 and generically referred to as the terminal 120) for running wildfire detection applications, and a processing station 117 (not shown) for providing data services.

In an embodiment, the application server 118 includes a plurality of third party servers. A third party server 118 may be a data server. The third-party server 118 may be connected to the network server 116 over the network 112. The network server 116 may obtain weather data, vegetation data, fire history data, and other related data from the third-party server 118. The weather data may include wind data, temperature data, precipitation data, sunshine intensity data, and other related data.

The network server 116 may process the data acquired from the data collecting devices 110 and the third-party server 118 through artificial intelligence or machine learning algorithms for ultra-early wildfire detection, fire danger predictions, and/or fire location probability determination. The network server 116 may map the fire danger for a covered geographic area.

The data collecting devices 110 may be connected to one another through the network gateways 114 or the network 112 to transmit data. The data collecting devices 110 may be further connected to the network server 116 through the network gateways 114 to provide data transmission and interoperability between different network protocols of devices.

The environmental data, as sensed individually by a data collecting device 110 or merged across data collecting devices 110, may be delivered by the data collecting devices 110 to the network gateway 114. In an embodiment, each data collecting device 110 sends the environmental data to the network gateway 114. The sensor assembly (not shown) in the data collecting device 110 may be configured to send the environmental data to the network gateway 114. The wireless communication module (not shown) in the data collecting device 110 may be configured to send the environmental data to the network gateway 114. Each of the data collecting devices 110 are configured to collect environmental data from each of the sensors. The environmental data may be transmitted over the network 112 using LoRa or LoRaWAN protocols. The data collecting devices 110 may receive environmental data from the neighboring devices 110, such as a neighbouring data collecting device 110 using the LoRa or LoRaWAN protocol. Furthermore, a receiving gateway 114 may be configured as LoRaWAN gateway 114. Similarly, the data collecting devices 110 may receive data from a LoRaWAN gateway 114. The data may be merged with data from the sensors by the neighboring data collecting device 110. Each sensor may select between eight frequency channels for transmission.

In an embodiment, the environmental data is transmitted on a LoRa 8-frequency channel. In another embodiment, the data collecting devices 110 and the network gateway 114 transmit data on multiple frequency channels to reduce interference and increase traffic handling capacity. The environmental data may be transmitted at a specific time period in time synchronization. The environmental data may be transmitted at a pre-defined time interval.

In an embodiment, the data collecting devices 110 and the network gateway 114 listen for, receive, or detect any communication via each of the 8 frequency channels. In an embodiment, the data collecting device 110 receives the environmental data from the other data collecting devices 110 over the network 112. The low-power processing module in the data collecting device 110 may be configured to add the environmental data collected by the data collecting device 110 with the environmental data received from the other data collecting devices 110 for transmitting the combined messages to the network gateway 114.

In an embodiment, when any of the data collecting devices 110 and the LoRaWAN gateway 114 receive one of the messages from a neighbouring device 110 or from the LoRaWAN gateway 114, the receiving data collecting device 110 and/or the receiving LoRaWAN gateway 114 add data within the message for transmission during the next interval.

The network 112 may be configured as a wired, wireless, or hybrid (partially wired and wireless) network based on a type of communication links used for connecting devices. The wired network 112 may include physical cables, such as Ethernet™ cables, to connect components in the system 100. The wireless network 112 may include Wi-Fi™, Wi-Max™, radio-frequency identification (RFID), or Bluetooth™ functionality to connect components in the system 100. The hybrid network may include a combination of wired and wireless networks. Ethernet™ connections may be made between switches and routers (not shown) to provide wireless connections between the terminals 120 using wireless connections.

The network 112 may be a Low Power Wide Area Network (LPN) configured to include multiple network protocols such as LoRa and/or LoRaWAN protocols. A LoRa protocol is a network protocol that utilizes low-power and long-range wireless technology within a wireless spectrum. A LoRaWAN protocol is an open, cloud-based protocol that enables devices to communicate wirelessly with LoRa. The LoRaWAN protocol uses a LoRa modulation technique to enable low data rate communication over long distances while minimizing power consumption.

The network gateways 114 may be configured to provide communication between networks or devices with different protocols, for example between the network 112 and the data collecting device 110*a* when the former is using the LoRa protocol and the latter is using the LoRaWAN protocol. The network gateway 114 may provide protocol conversion service, allowing networks 112 with different architectures and communication standards to connect and transmit data. The network gateway 114 may be configured to translate and convert data between different network protocols, such as LoRa and LoRaWAN. Furthermore, the network gateway 114 may be configured to perform address translation (for example, Network Address Translation (NAT) service, data filtering and security, and routing and traffic management).

The network gateways 114 may provide a communication link between wireless communication modules in the data collecting devices 110 and the processing station 117. Furthermore, the network gateways 114 may provide data processing such as filtering, compression or validation to optimize data transmission.

The plurality of low-power data collecting devices 110 configured for ultra-early wildfire detection.

Figure 5:
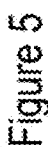
FIG. 5 is a top view of a system for early wildfire detection in deployment, according to an embodiment.

The data collecting devices 110 are organized or arranged according to a mesh topology (see FIG. 5). Advantageously, the mesh network topology provides higher resilience, decentralization, and scalability. In event of a failure or damage to one device 110, data may be transmitted to the gateway 114 through alternative paths. Such data may include environmental data, i.e., data sensed by a device with respect to the external environment about the device. Further, additional data collecting devices 110 may be added to the system 100 without significant network reconfiguration. According to an embodiment, the data collecting devices 110 are optimized for reduced power consumption through time synchronization techniques. Techniques including duty cycling, time-slotted communication, coordinated sensing, power-efficient routing, and reduced idle listening may be used. The data collecting devices 110 are configured to activate data collection, reception, and transmission at predefined time schedules, and alternatively enter low-power inactive modes. Furthermore, the data collecting device 110 may be synchronized with other devices 110 to provide coordinated sensing and power-efficient routing.

According to an embodiment, each data collecting device 110 connects to at least one other data collecting device 110. The data collecting devices 110 may be connected to other data collecting devices 110 through the network gateways 114 or directly. In an embodiment, each data collecting device 110 is connected to at least one other data collecting device 110. The data collecting devices 110 may each connect to the network server 116 through the network gateways 114. Because each data collecting device 110 connects to some or all of the other data collecting devices 110 and because at least some of the data collecting devices 110 connect to the network gateway 114, data from each data collecting device 110 is able to be sent to the network gateway 114, whether directly (i.e., through direct transmission between the data collecting device 110 and the network gateway 114 through the network 112) or indirectly (e.g., from a further data collecting device 110 through the network to the data collecting device 110*a* to the network gateway 114*a* through the network 112).

According to an embodiment, each data collecting device 110 transmits environmental data to one or more other data collecting devices 110 over the network 112. The data collecting device 110 may receive additional environmental data from the other data collecting devices 110 over the network 112. The low-power processing module in the data collecting device 110 may be configured to merge the environmental data with the additional environmental data to form merged environmental data for transmitting over the network 112.

In an embodiment, the data collecting device 110 directly senses environmental data and further receives environmental data sensed by the other device 110. Thereafter, the device 110 may transmit the directly sensed environmental data and the received environmental data to the network 112. The foregoing process may be repeated until the collection of environmental data sensed by the plurality of data collecting devices 110 is delivered to the network gateway 114. Various network protocols may be used to transmit data within or from the data collecting devices 110. Preferably, low-powered network protocols including LoRa and LoRaWAN are used for transmission of the environmental data. In an embodiment, the merged environmental data includes environmental data as received from the other data collecting devices 110.

The environmental data may relate to the presence or absence of wildfire in the vicinity of the data collecting device 110. The environmental data may be processed within the data collecting device 110. Thereafter, the processed environmental data may be transmitted over the network 112. The data collecting device 110 may transmit the environmental data over the network 112. The data collection may receive related data, information, or instructions from the network 112.

The data collecting device 110 includes a plurality of sensors for collecting the environmental data and a filter for protecting the plurality of sensors. The plurality of sensors may be grouped in the sensor assembly within the data collecting device. The sensors may be configured as low-power data collecting devices for ultra-early wildfire detection. The sensors may detect environmental conditions, such as the presence/absence of elements associated with fire such as carbon dioxide, carbon monoxide, nitrogen dioxide, temperature, and/or humidity. In an embodiment, the filter is removeable.

The data collecting device 110 is configured to operate on a plurality of modes of operation or data transmission or network protocols. The wireless communication module may be configured to provide multiple modes of operation or data transmission or network protocols. The plurality of modes of operation may include LoRa end-node, LoRaWAN end-node, LoRa repeater mode, and LoRa to LoRaWAN mode. The modes of operation may represent various interoperability operations and utilities such as low battery consumption (LoRa), long-distance communication (LoRaWAN), extending communications (repeater mode), and interoperability between LoRa and LoRaWAN protocols, respectively. The data collecting device 110 may select the mode of operation or data transmission based on the location of the device 110 in the network 112. The data collecting device 110 may automatically select the mode based on the protocol through which data is received. For example, a LoRa mode may be selected on receiving a LoRa message or a LoRaWAN mode may be selected on receiving a LoRaWAN message.

According to an embodiment, the network gateways 114 may be configured as a LoRaWAN gateway 114. Where one of the data collecting devices 110 receives only a LoRaWAN message from a LoRaWAN gateway 114 (i.e., has a direct connection to the gateway 114), the data collecting device 110 selects a mode corresponding to a LoRaWAN end-node mode. Similarly, the data collecting device may select the LoRaWAN end-node mode on receiving a LoRaWAN message from a neighboring data collecting device. In the LoRaWAN end-node mode, the data collecting device 110 collects sensor data from sensors (not shown) within the data collecting device 110 for transmission over the network 112 via a further LoRaWAN message.

If the data collecting device 110a receives a LoRaWAN message from a LoRaWAN Gateway and further receives a LoRa message from the data collecting device 110b, the data collecting device 110a selects a LoRa to LoRaWAN mode. In the LoRa to LoRaWAN mode, the data collecting device 110a receives data from the data collecting device 110b via LoRa messages (i.e., receives data collected by the sensors of the data collecting device 110b) and merges data from the sensors of the data collecting device 110a with the received data from the data collecting device 110b for transmission over the network 112 in the LoRaWAN protocol to be received by the gateway 114. Merging the data may include aggregating the data of the device 110a with the device 110b without altering or compressing the data of the device 110a or the data of the device 110b. Merging the data may include pre-processing, altering, compressing, or post-processing the data of the device 110a or the data of the device 110b.

If the data collecting device 110 receives only LoRa messages from other devices 110, the data collecting device 110 selects a LoRa repeater mode. In the LoRa repeater mode, the data collecting device 110 receives data from the other devices 110 via LoRa messages (i.e., receives data collected by the sensors of the other data collecting devices 110) and merges data from the sensors of the other devices 110 with data from sensors of the device 110 for transmission via LoRa messages over the network 112.

If one of the data collecting devices 110 is located at an end of the network 112 away from any network gateway 114, then the data collecting device 110 may transmit data from its own sensors over LoRa messages to one or more other data collecting devices 110. Further, if the data collecting device does not need to repeat the environmental data and does not have direct access to any LoRaWAN Gateway 114, then the data collecting device 110 may transmit data from its own sensors over LoRa messages to one or more other data collecting devices 110.

The processing station 117 may be integrated in the network server 116 as shown in FIG. 1. The processing station 117 provides data services including sending, receiving, analyzing, and processing data received from the network gateways 114. The processing station 117 may perform advanced data processing techniques including machine learning algorithms and data fusion to detect and verify wildfire incidents. When the processing station 117 confirms that a wildfire has occurred, the processing station 117 generates alerts and notifications for relevant authorities to respond promptly and effectively to the incident.

The processing station 117 may be connected to the network 112 and the plurality of application servers 118 and terminals 120 for running wildfire detection applications. The application server 118 may be configured as a middleware between the processing station and the terminals 120 for running wildfire detection applications. The application server 118 may provide services including web application hosting, resource management, connection pooling, memory allocation, load balancing, data transaction management, data access, application logic, database management, business logic processing, interoperability services, application programming interface (API) integration, and security such as encryption and data authentication.

The terminals 120 include computer terminals for accessing the processed data from the wildfire detection system 100, for example outputs of the processing station 117 transmitted through the application servers 118. The terminals 120 may include mobile devices, smartphones, tablets, desktop computers, laptops, thin clients, kiosks, data processing terminals, and workstations.

Referring now to FIG. 2, shown therein is a simplified block diagram of components of a device 200, according to an embodiment. The device 200 may correspond to any of the data collecting devices 110 shown in FIG. 1. The device 200 includes a processor 202 that controls the operations of the device 200. The processor 202 may be a low-power processing module in the data collecting device 110. Communication functions, including data communications, voice communications, or both may be performed through a wireless communication subsystem 204. The communication subsystem may be a wireless connection module in the data collecting device 110. The communication subsystem 204 may receive messages from, and send messages to, a wireless network 250. The wireless network may be the network 112 in FIG. 1. Data received by the device 200 may be decompressed and decrypted by a decoder 206.

The wireless network 250 may be any type of wireless network, including, but not limited to, data-centric wireless networks, voice-centric wireless networks, and dual-mode networks that support both voice and data communications.

The device 200 may be a battery-powered device and as shown includes a battery interface 242 for connecting to one or more rechargeable batteries 244. The device 200 may include a power supply assembly (not shown). The device 200 may further include one or more non-rechargeable batteries (not shown).

The processor 202 also interacts with additional subsystems such as a Random Access Memory (RAM) 208, a flash memory 210, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232 and other device subsystems 234.

In some embodiments, user-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a portable electronic device generated by the processor 202 may be displayed on the touch-sensitive display 218.

The processor 202 may also interact with an accelerometer 236 as shown in FIG. 2. The accelerometer 236 may be utilized for detecting direction of gravitational forces or gravity-induced reaction forces.

To identify a subscriber for network access according to the present embodiment, the device 200 may use a Subscriber Identity Module or a Removable User Identity Module (SIM/RUIM) card 238 inserted into a SIM/RUIM interface 240 for communication with a network (such as the wireless network 250). Alternatively, user identification information may be programmed into the flash memory 210 or performed using other techniques.

The device 200 also includes an operating system 246 and software components 248 that are executed by the processor 202 and which may be stored in a persistent data storage device such as the flash memory 210. Additional applications may be loaded onto the device 200 through the wireless network 250, the auxiliary I/O subsystem 224, the data port 226, the short-range communications subsystem 232, or any other suitable device subsystem 234.

For example, in use, a received signal such as a text message, an e-mail message, web page download, or other data may be processed by the communication subsystem 204 and input to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the device 200 may be similar. The speaker 228 may output audible information converted from electrical signals, and the microphone 230 may convert audible information into electrical signals for processing.

Figure 3:
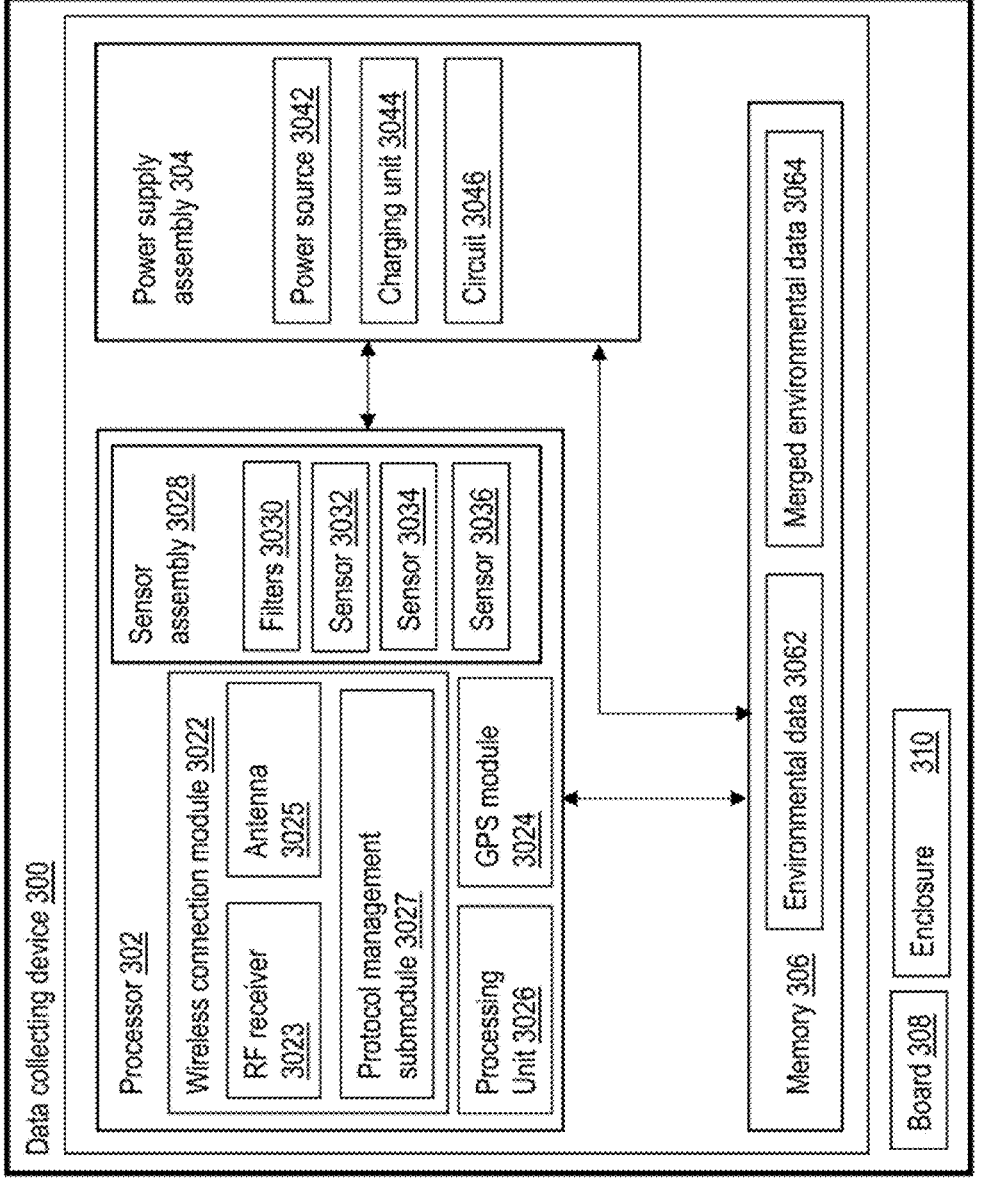
FIG. 3 is a block diagram of a data collecting device for early detection and monitoring of wildfires, according to an embodiment.

Referring now to FIG. 3, shown therein is a block diagram of a data collecting device 300 for early detection and monitoring of wildfires, according to an embodiment. The data collecting device 300 may be a data collecting device 110 of FIG. 1.

The data collecting device 300 includes a processor 302, a power supply assembly 304, a memory 306, a board 308 for providing circuits, and an enclosure 310 for providing protective cover to components of the device 300.

The processor 302 includes a wireless connection module 3022 for providing connectivity services, a global positioning system (GPS) module 3024 for providing location information, a processing unit 3026 to execute instructions, and a sensor assembly 3028 including a plurality of sensors 3032-3036. The sensors 3032-3036 may be connected to a plurality of filters 3030 to improve accuracy and reliability of the measured data. The processing unit 3026 may be configured as a low-power processing module.

The power supply assembly 304 may include a power source 3042 to store and provide electrical power, a charging unit 3044 to charge the power source, and a circuit 3046 to provide control of the electrical current. The charging unit 3044 may include a solar charging apparatus including a solar panel.

The wireless connection module 3022 may be configured to connect the data collecting device 300 to the wildfire detection network 112 of FIG. 1 to enable wireless data transmission and reception therebetween. The wireless connection module 3022 may connect to the network gateway 114 and other data collecting devices in the wildfire detection network 112.

The wireless connection module 3022 may include a radio frequency receiver 3023 to transmit and receive signals at specific radio frequencies and at specific time intervals. The wireless connection module 3022 may be configured to convert received radio frequency signals into digital data that may be processed by the low-power processing unit 3026. The wireless connection module 3022 includes an antenna 3025 configured to convert the signals into electromagnetic waves for transmission. The wireless connection module 3022 may be configured to connect the components within the data collecting device 300, including the processor 302, sensor assembly 3028, power supply assembly 304, and memory 306.

In an embodiment, in addition to the wireless communication module 3022, the data collecting device 300 includes a wired communication module (not shown) suitable to communicate with other data collecting devices 300 and the network gateway 114 over a hybrid network 112 as discussed in FIG. 1. Alternatively, a wired network 112 may be provided and the data collecting device 300 may include a wired communication module (not shown) configured to communicate with other data collecting devices 300 and the network gateway 114.

The wireless connection module 3022 is configured to transmit data collected by sensors 3032-3036 to the network gateway 114 or other data collecting devices 300 within the wildfire detection system 100. The wireless connection module 3022 may connect the data collecting device 300 to the network 112. The wireless connection module 3022 may also provide services including packet formation, error checking, encryption and addressing. The wireless connection module 3022 may provide network management tasks, including discovery of data collecting devices 300, configuration of the wildfire detection network 112, and maintaining connections with other data collecting devices 300.

The wireless connection module 3022 may also be configured to manage communication protocols such as Wi-Fi™, Zigbee™, Bluetooth™, LoRa and LoRaWAN to facilitate secure data transmission with low power consumption. In an embodiment, the wireless connection module 3022 is configured as a LoRa wireless connection module and/or or a LoRaWAN connection module.

The data collecting device 300 is configured to operate in a plurality of modes of operation or data transmission. The plurality of modes include LoRa end-node, LoRaWAN end-node, LoRa repeater mode, and LoRa to LoRaWAN mode. The modes of operation may represent various interoperability operations and utilities such as low battery consumption (LoRa), long-distance communication (LoRaWAN), extending communications (repeater mode), and interoperability between LoRa and LoRaWAN protocols, respectively. The protocol management submodule 3027 in the data collecting device 300 may automatically select the mode based on the location of the device 300 in the network 112. The protocol management submodule 3027 may automatically select the transmission mode based on the protocol through which the data is received. For example, a LoRa mode may be selected on receiving a LoRa message or a LoRaWAN mode may be selected on receiving a LoRaWAN message.

LoRa (Long Range) includes a digital wireless data communication technology that utilizes low frequency radio frequency bands and modulation techniques to provide long-range communication and low power consumption. The LoRa protocol may address the physical layer of communication and format the data sent and received between the data collecting devices 300. LoRaWAN (Long Range Wide Area Network) includes a standardized protocol built upon LoRa technology providing higher abstraction. The LoRaWAN protocol may include both the communication protocol and system architecture for a LoRa-based network to enable efficient, secure, scalable data transmission between data collecting devices 300 and network gateways 114.

The wireless connection module 3022 may include a protocol management submodule 3027. To enable low-power functionality, the protocol management submodule 3027 may be configured to provide protocol management for LoRa and LoRaWAN data transmission protocols, including providing services for each protocol. The services may include packet formation, error checking, device detection, addressing, and encryption. The protocol management submodule 3027 may format the data collected by the sensors into packets in accordance with LoRa or LoRaWAN specifications based on requirements of the network 112. Such formatting includes adding headers, metadata and control information for proper routing and processing by the network gateway 114 or other devices of the system 100. The LoRaWAN protocol may rely on error checking mechanisms such as Cyclic Redundancy Check (CRC) or Forward Error Correction (FEC) to detect and correct errors during data transmission. The protocol management submodule 3027 may be configured to implement the error checking and provide data integrity and reliability information. Further, the LoRaWAN protocol may utilize device identifiers (DevEUI) and network identifiers (NetID) to address data collecting devices on the wildfire detection network. The protocol management submodule 3027 may be configured to manage an addressing scheme therefor and to provide data transmission between data collecting devices 300 and routing within the system 100. Furthermore, the LoRaWAN protocol may utilize an adaptive data rate mechanism that adjusts data rates and transmission power of the devices 300 based on distance of each device 300 from the gateway 114 and further based on conditions of the network 112. The protocol management submodule 3027 may be configured to manage this feature, optimizing energy consumption and network capacity.

To provide security services, the protocol management submodule 3027 may be configured to implement security features of LoRaWAN or LoRa security features. The protocol management submodule 3027 may be configured to implement encryption mechanisms such as Advanced Encryption Standard (AES) with a 128-bit key to protect sensitive information from unauthorized access.

The protocol management submodule 3027 may be configured to perform network and protocol related tasks, including device activation and joining procedures and acknowledging and processing messages sent from the network gateway 114.

The protocol management submodule 3027 may also provide for and/or enable optimized power consumption to save energy and extend battery life of each device 300. Such optimized power consumption includes time-synchronization and entering low-power modes when each device 300 is not actively transmitting or receiving data. The protocol management submodule 3027 may be configured to operate the time synchronization with respect to each of sensors 3032-3036. The sensors 3032-3036 and processing unit 3026 may be optimized for reduced power consumption through time synchronization techniques. Techniques including duty cycling, time-slotted communication, coordinated sensing, power-efficient routing, and reduced idle listening may be used. The processing unit 3026 may be configured to activate data collection in the sensors 3032-3036 at predefined time schedules and enter low-power inactive modes outside of the predefined time schedules and/or cause the sensors 3032-3036, the radio-frequency (RF) receiver 2023, and the antenna 3025 to enter low-power inactive modes outside the predefined time schedules. Similarly, the protocol management submodule 3027 may be configured to receive and transmit environmental data at predefined time schedules and alternatively enter low-power inactive modes.

The processing unit 3026 may be configured as a low-power processing module. The low-power processing module 3026 may be connected to the wireless connection module 3022 and other components of the data collecting device 300. The low-power processing module 3026 may be configured to receive data from the sensor assembly 3028 and the GPS module 3024. The low-power processing module 3026 may process or merge the data and communicate the processed data to the network 112 through the wireless connection module 3022.

The low-power processing module 3026, may be configured as low-power computing systems configured to execute instructions stored in memory 306 or on other similar storage devices. The instructions may include one or more separate programs, which may comprise an ordered listing of executable instructions for implementing logical functions. The low-power processing module 3026 may control the execution of other computer programs and provides scheduling, input-output control, file and data management, memory management, and communication control and related services.

The filters 3030 may be used to provide protection to the plurality of sensors 3032-3036 and enhance performance, improve measurement accuracy, and protect the sensors 3032-3036 from interfering signals. The filters 3030 may include bandpass filters to allow a specific wavelength range of light to enter the sensors, neutral density filters to attenuate the intensity of light entering the sensor, chemical filters to allow selective detection of gases, particulate filters to prevent solid particles, dust, or aerosols from interfering with the sensing process, hydrophobic filters to prevent the ingress of water vapor or liquid water, moisture control filters to control humidity levels, and/or temperature control filters.

Data sensed by the sensors 3032-3036 is stored in the memory 306 as environmental data 3062. The environmental data 3062 may thereafter be transmitted to the low-power processing module 3026. Detection by the sensors 3032-3036 is configured to collect and monitor the environmental data 3062 to facilitate detection of conditions suggesting wildfire. The conditions may include detecting, identifying, and measuring the environmental data 3062 in proximity to the sensors 3032-3036 such as chemicals, gases, and physical conditions such as temperature and humidity. When environmental data 3062 received at a device 300 from a different device 300 is merged with environmental data 3062 collected at the device 300, such merged data is stored in the memory 306 as merged data 3064. The plurality of sensors 3032 to 3036 are configured for low power consumption and provide ultra-early wildfire detection using time synchronization as hereinabove described. The sensors 3032-3036 detect environmental conditions, such as the presence/absence of elements associated with fire such as carbon dioxide, carbon monoxide, nitrogen dioxide, temperature, and/or humidity. The conditions may include temperature, humidity, smoke, or infrared radiation. A temperature sensor (e.g., the sensor 3032) may include a thermistor or thermocouple to measure the ambient temperature in a surrounding environment. When the temperature sensor 3032 records a sudden increase in temperature or once a predefined threshold is exceeded, this may indicate fire activity. A humidity sensor (e.g., the sensor 3034) may detect air humidity and moisture levels in the environment close to the sensor. A low humidity level may indicate a risk of wildfire.

A smoke sensor (e.g., the sensor 3036) may include optical, photoelectric, ionization, or other types of sensors configured to detect the presence of smoke particles in the air. The presence of smoke may indicate a wildfire. Further, a gas sensor (e.g., the sensor 3036) may detect the presence of combustion gases. The gas sensor 3036 may be configured to detect carbon monoxide (CO) or volatile organic compounds (VOCs) that may be produced during a fire. Humidity data may be combined with other sensor data to assess the likelihood of a wildfire occurring. The sensors 3032-3036 may further detect wind speed and direction.

The data collecting device 300 includes a power supply assembly 304 to provide electrical power to the components of the data collecting device 300.

The power supply assembly 304 includes a power source 3042 to store and provide electrical power, a charging unit 3044 to charge the power source, and a circuit 3046 to provide control of the electrical current. The charging unit 3044 may include a solar charging apparatus including a solar panel.

In an embodiment, the power source 3042 includes a plurality of batteries. The power source includes a non-rechargeable and a rechargeable battery. The rechargeable battery may be a solar cell. The plurality of batteries may include rechargeable batteries and high-capacity non-rechargeable batteries. The power collection apparatus may include a solar cell for charging the plurality of batteries. The rechargeable battery may serve as a first power source until an energy level of the rechargeable battery reaches a predetermined limit. The non-rechargeable battery may serve as a second power source when the energy level is at the predetermined limit until the rechargeable battery is recharged so that the energy level is not at the predetermined limit.

The power management circuit 3046 may be configured as a smart power management circuit. The smart power management circuit 3046 may recharge a battery of the charging unit 3044 until the battery capacity drops below a threshold (e.g., 30%). At that point, the circuit 3046 may switch to a high-capacity non-rechargeable battery until the rechargeable battery recharges to a predetermined threshold (80%). This feature reduces power consumption of the device 300. Furthermore, the circuit 3046 may optimize warm-up times of the sensors 3042-3046 and intervals in data transmission.

The data collecting device 300 may be physically enclosed in a protective enclosure 310.

The board 308 may have a modular design for the board 308. The board 308 may be configured to provide for the sensors 3042-3046 to be integrated into or removed from the device 300. The board 308 may be configured to receive the filter 3030. In an embodiment, the filter 3030 is a removable gas filter.

Figure 4:
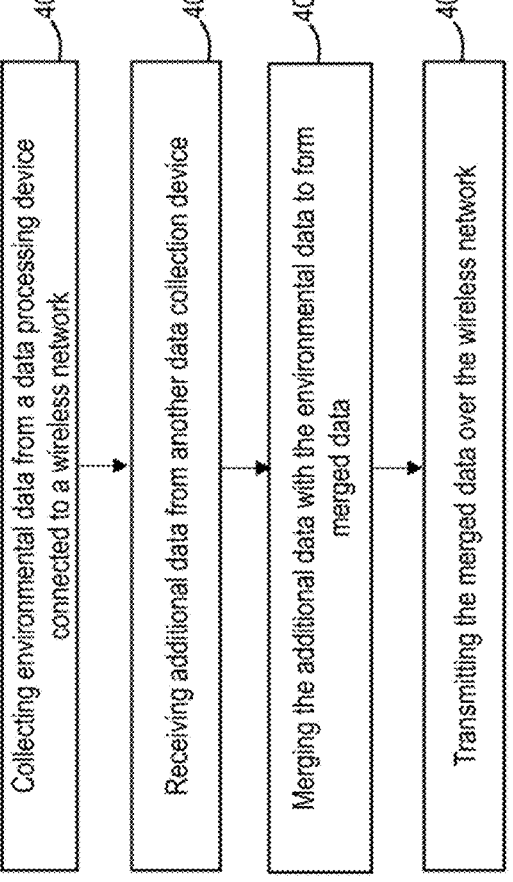
FIG. 4 is a flow diagram of a method for early detection and monitoring of wildfires, according to an embodiment.

Referring now to FIG. 4, shown therein is a flow diagram of a method 400 for early detection and monitoring of wildfires, according to an embodiment.

At 402, environmental data is collected from a data collecting device connected to a wireless network. The data collecting device may be the data collecting device 110 of FIG. 1 connected to the network 112 of the system 100. The data collecting device may be the data collecting device 300 of FIG. 3.

At 404, additional data from a neighboring data collecting device is received. In an embodiment, the neighboring data collecting device is a different data collecting device 110 or 300. The additional environmental data may include the environmental data sensed by the neighboring data collecting device 110 or 300. The additional environmental data may include the environmental data received by the neighboring data collecting device 110 or 300 from another data collecting device 110 or 300.

At 406, the additional data received from the neighboring data collecting device is merged with the environmental data sensed by the data collecting device to form merged data. In an embodiment, the processing unit 3026 merges the environmental data from the sensors 3032-3036 with the additional data from the neighbouring data collecting devices 300 (whether collected by the sensors 3032-3036 of the neighbouring devices 300 or received from still other devices 300) to form the merged data.

A first data collecting device may sense and process environmental data locally. Thereafter, the first data collecting device may receive processed environmental data from a second device. The first data collecting device may provide data packaging operations to merge environmental data sensed thereby with the additional environmental data collected from the neighboring device. The data packaging operations may include format change, protocol optimization, data encoding, data encapsulation, data segmentation, and data compression. Such a collaborative approach between and among the data collecting devices provides coverage over a larger area, improves data accuracy, and increase the reliability of the overall system.

At 408, the merged data is transmitted over a network. In an embodiment, the processing unit 3026 transmits the merged data through the wireless connection module 3032. In an embodiment, the merged data is transmitted to the network gateway 114. The network gateway 114 may perform additional processing and analysis. The environmental data is transmitted to the network server 116 or processing station 117 for additional processing and aggregation. The data is received by the application servers 188, where the data may be visualized, monitored, or used for decision-making purposes. The data may ultimately be received by the terminals 120.

Each component of the system may receive related data, information, or instructions from the network.

The low-powered wildfire detection system provides energy efficiency, extended operational life, scalability, and improved communication. Interoperability across a variety of network protocols is achieved and provides enhanced effectiveness and versatility of the system. Devices using different protocols may communicate with one another effectively. As a result, various protocols may be implemented in the network infrastructure providing simplified integration, scalability, enhanced reliability, fault tolerance, and cost savings. By providing time synchronization, power consumption is reduced. The sensors may collect environmental data at predetermined time schedules, obviating the need of keeping the antennas active for longer duration. As a result, the sensors may operate for longer periods without requiring battery replacement or recharging. The sensors may operate in a synchronized manner leading to efficient network management, improved sensor collaboration, and enhanced data accuracy. The optimized power supply including rechargeable and non-rechargeable batteries may provide further advantages via extended device operation time, reliability, and improved performance. The power supply redundancy, including consumption of a solar powered rechargeable battery until the power levels in battery are critically low and then shifting to a non-rechargeable battery until the rechargeable battery is at least partially recharged, provides for flexible power management and power adaptability.

Referring now to FIG. 5, shown therein is a top view of a system for early wildfire detection in deployment. The system 500 includes a plurality of data collecting devices 502 disposed in a mesh topology. In the interest of clarity, not all the data collecting devices 502 are labelled in FIG. 5, but it will be appreciated that like symbols are all data collecting devices 502. The data collecting devices 502 may be the data collecting devices 110 of FIG. 1 or the data collecting devices 300 of FIG. 3.

Advantageously, each device 502 may communicate with network gateways (not shown) in FIG. 5 according to multiple paths. Therefore there is redundancy in the deployment shown in FIG. 5 because the deactivation of any one device 502 does not impede the system 500. For example, if one or both of the two sensors marked 502 were rendered non-functional (e.g., destroyed by wildlife), neighbouring devices 502 thereto may advantageously continue to transmit collected environmental data along a different and previously redundant path to a network gateway.

Figure 6:
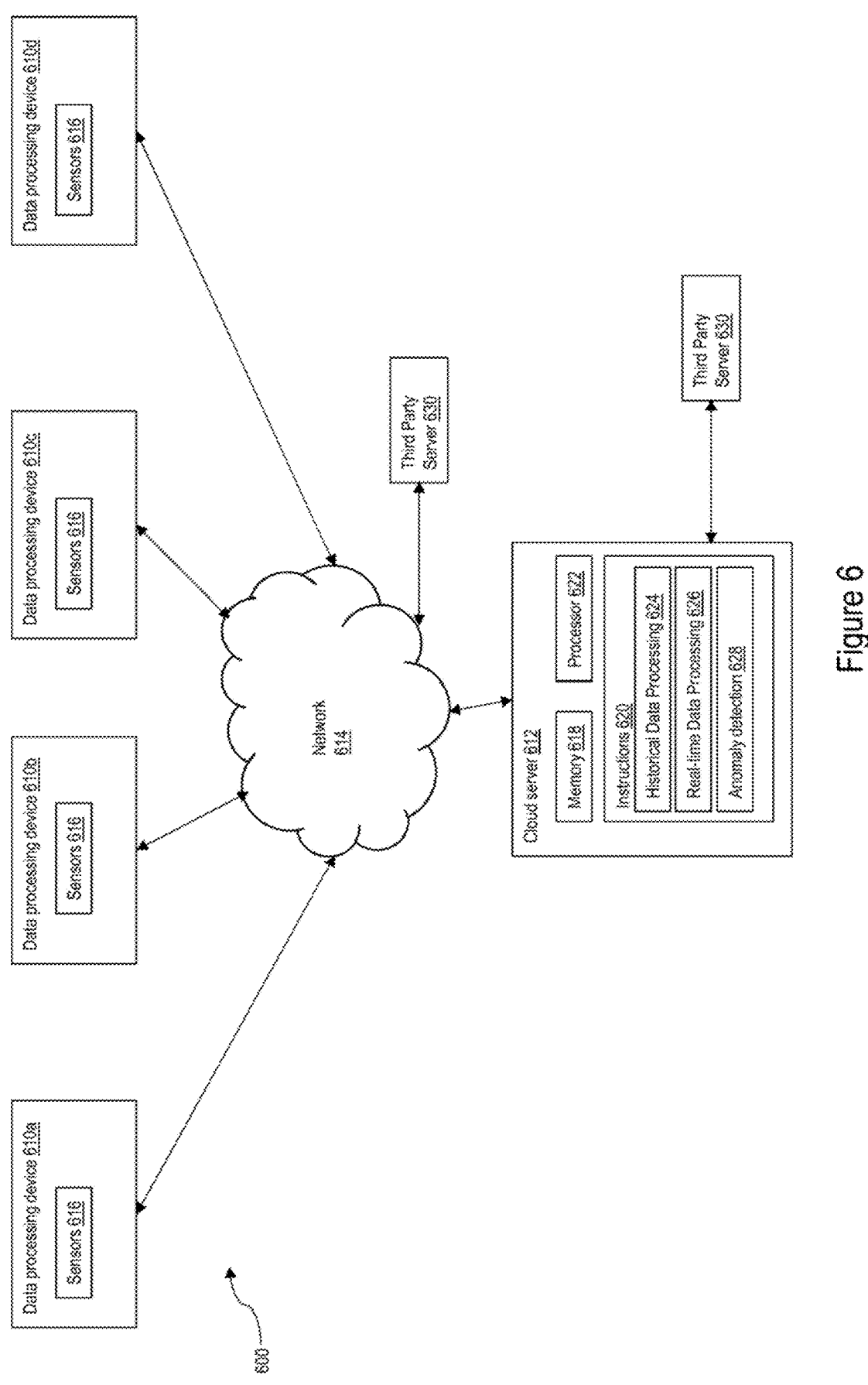
FIG. 6 is a schematic diagram of a system for wildfire detection and prediction, according to an embodiment.

Referring now to FIG. 6, shown therein is a schematic diagram of a system for wildfire detection and prediction, according to an embodiment.

The system 600 includes a plurality of data collecting devices 610a, 610b, 610c, and 610d (collectively referred to as the devices 610 and generically referred to as the device 610) configured to send environmental data to a network 614. The network 614 is connected to a third-party server 630. The network 614 is further connected to a cloud server 612. Each device 610 includes sensors 616 for sensing environmental data. The device 610 may be a data collecting device 110 of FIG. 1.

The third-party server 630 may be a data server. The third-party server 630 may be connected to the cloud server 612 over the network 614. The cloud server 612 may obtain weather data, vegetation data, fire history data, and other related data from the third-party server 630. The weather data may include wind data, temperature data, precipitation data, sunshine intensity data, and other related data.

The cloud server 612 may process the data acquired from the data collecting devices 610 and the third-party server 630 through artificial intelligence or machine learning algorithms for ultra-early wildfire detection, fire danger predictions, fire location probability determination. The cloud server 612 may map the fire danger for a covered geographic area. The cloud server 612 may be configured to predict fire incidents by performing calculations based upon sensor data, sensor data patterns, sensor data relationships, historical data, real-time data, estimated data, and related data.

The cloud server 612 may include memory 618 having computer readable instructions 620 and a processor 622 for executing the computer readable instructions 620. The instructions 620 may be stored in the memory 618. The instructions 620 may be stored separately to the memory 618, e.g., as part of a removable secondary storage device such as a CD or a USB key. The instructions 620 include historical data processing instructions 624, real-time data processing instructions 626, and anomaly detection instructions 628. The instructions 620 may be organized as an algorithm that has three layers of processing: historical data processing; real-time data processing; and multivariate mapping and anomaly detection. In an embodiment, the processor includes a plurality of processing modules (not shown) including a historical data processing module to execute the historical data processing instruction 624, a real-time data processing module to execute the real-time data processing instructions 626, and a multivariate mapping and anomaly detection module to execute the multivariate mapping and anomaly detection instructions 628.

The real-time processing includes processing of data acquired by the sensors 616. The real-time processing may occur according to stream data processing.

The historical data processing may occur through batch processing, e.g., in the context of training data provided to a convolutional neural network, e.g., a graph neural network.

Multivariate mapping and anomaly detection may be considered to be a combination of real-time processing and historical data processing.

The instructions 620 may further include instructions for external data processing (not shown). External data processing may include processing of third-party data for larger areas than the data acquired by the sensors 616 or the historical data, e.g., sun intensity across a larger area. The third-party data may be weather data, vegetation data, fire history data, and other related data from the third-party server 630.

Multivariate mapping and anomaly detection may be considered to be a combination of real-time processing, historical data processing, and external data processing.

The data collecting devices 610 are positioned at a plurality of locations over a geographic area, e.g., each device 610 in a particular location. The cloud server 612 collects environmental data and location data from the plurality of data collecting devices 610 over the network 614. The server 612 populates a map (not shown) of the geographic area with the location data and the environmental data.

To predict wildfires, the cloud server 612 obtains and analyzes weather data, vegetation data, fire history data, and other relevant data from the third-party server 630 over a network 614. The cloud server 612 determines the probability of a wildfire occurring at the plurality of locations within the geographic area based on the data received from the third-party server 630 and data received from the data collecting devices 610. The cloud server 612 may determine the probability that a wildfire will occur at a plurality of locations within the geographic area using data received from the third-party server 630 and historical environmental data obtained from the data collecting devices 610. Alternatively, historical data may be received from the third-party server 630 and sensed environmental data may be received from the data collecting devices 610.

The cloud server 612 may further obtain and analyze sensor data, sensor data patterns, sensor data relationships, real-time data, and historical data. The server may also obtain data from the data collecting devices 610.

The cloud server 612 collects absolute values for a location based on the corresponding sensor data. For neighbouring locations, on a pixelated map, of a primary location for which absolute values were collected, the cloud server 612 estimates values based on the absolute values of the primary location. This technique may be used to generate estimates of sensor values for the whole map.

The cloud server 612 determines whether an anomaly has occurred at each of the plurality of locations within the geographic area from real-time environmental data that is received from the data collecting devices 610.

The cloud server 612 generates output related to at least one location on the map regarding the probability of the wildfire and/or whether an anomaly has occurred. The output may be communicated to a display device 632 for display.

In an embodiment, the cloud server 612 focuses on a 2D environment that is represented by a map of a city or a map of a forest area (not shown). The cloud server 612 may divide the map into significantly smaller portions to generate a pixelated map (not shown). The cloud server 612 may collect environmental data from the sensors 616 for aggregation on the pixelated map with corresponding location and sensor values. The data may be added to the corresponding locations on the pixelated map.

The cloud server 612 may consider the location of each sensor 616, as well as the sensor value, as absolute (correct) values. For other locations (i.e., pixels) on the pixelated map, the server 612 may read the value(s) of one or more nearby sensors 616 to estimate the value for the point that corresponds to the pixel. Through this technique, the cloud server 612 may generate estimates of sensor values for a whole map using the sensor data.

Referring now to FIG. 7, shown therein is a method 700 for wildfire detection and prediction, according to an embodiment.

At 702, environmental data is received from a plurality of data collecting devices are received. The environmental data includes location data, historical environmental data, and real-time environmental data.

The plurality of data collecting devices (e.g., the data collecting devices 110, the data collecting devices 610) connect to a wildfire prediction network. The plurality of data collecting devices include a plurality of sensors for collecting environmental data thereon. A wildfire prediction cloud server may receive the environmental data, which includes historical environmental data and real-time environmental data, and location data correlating to the location of each of the plurality of data collecting devices from the plurality of data collecting devices over the network and other related data. Furthermore, historical environmental data, e.g., for each location of the data collecting devices, may be provided by a third-party server.

At 704, a map of a geographic area is populated with the location data and the environmental data. The geographic area is a geographic area in which the plurality of data collecting devices are disposed.

The map may be populated on a 2D environment and may be divided into small portions to generate a pixelated map. The pixelated map may aggregate environmental data and sensor values collected by the device corresponding to a position on the pixelated map, e.g., filling in pixels for which no values are provided by the environmental data and sensor values based on the environmental data and sensor values of neighbouring pixels. Historical environmental may be similarly aggregated.

At 706, weather data for each location of the data collecting devices is received through the wildfire detection network. The weather data may be received from the third-party server through the wildfire detection network. The weather data may be received from the data collecting devices through the wildfire detection network.

Receiving the weather data may include collecting environmental and wildfire data from multiple sources, including third party data (e.g., third party historical data), sensor data and location data from data collecting devices, and other wildfire related data.

The third-party server may be connected to the cloud server over the network. The cloud server may obtain weather data, vegetation data, fire history data, and other related data from the third-party server. The weather data may include wind data, temperature data, precipitation data, sunshine intensity data, and other related data.

At 708, the probability of a wildfire at a plurality of locations within the geographic area is determined from the environmental data and the weather data. The determination may also be based on the external data and/or the other related data as hereinabove described.

An algorithm and dedicated processing modules may be employed to collect and analyze the historical environmental data, sensor location data, weather data, and related data. The algorithm and dedicated processing modules may have multiple layers of processing including a historical data processing layer, a real-time data processing layer, and a multivariate mapping and anomaly detection layer. The algorithm may be integrated with artificial intelligence and machine learning systems configured for ultra-early wildfire detection, fire danger predictions, and fire location probability determination.

To predict wildfires, the server may obtain and analyze weather data, vegetation data, fire history data, and other relevant data from a third-party server over a network. The server may determinate the probability of a wildfire based on the data received from the third-party server and data received from the data collecting devices.

The server may also obtain and analyze sensor data, sensor data patterns, sensor data relationships, real-time data, and historical data. The server may also obtain data from the data collecting devices. The weather data may include wind data, temperature data, precipitation data, sunshine intensity data, and similar data.

The server may collect absolute values for a location based on the corresponding sensor data. For the neighboring locations on a pixelated map, the server may estimate values of the neighboring locations based on the absolute values of a primary location. This technique may be used to generate estimates of sensor values for the whole map.

At 710, whether an anomaly has occurred within the geographic area is determined from the real-time environmental data.

Determining whether an anomaly has occurred includes determining the probability that a wildfire will occur at a location. The anomaly may be determined using the real-time data processing layer and the anomaly detection layer on the cloud server.

The method 700 may further include generating output related to at least one location on the map regarding the probability of the wildfire and/or whether an anomaly has occurred.

An anomaly may be considered an unexpected value as measured by a sensor relative to an expected, determined, or calculated value. A plurality of anomalies may be a strong indication that a wildfire has or may occur. When an anomaly is detected, the method may further include checking other sensors to determine the presence of the wildfire.

Figure 8:
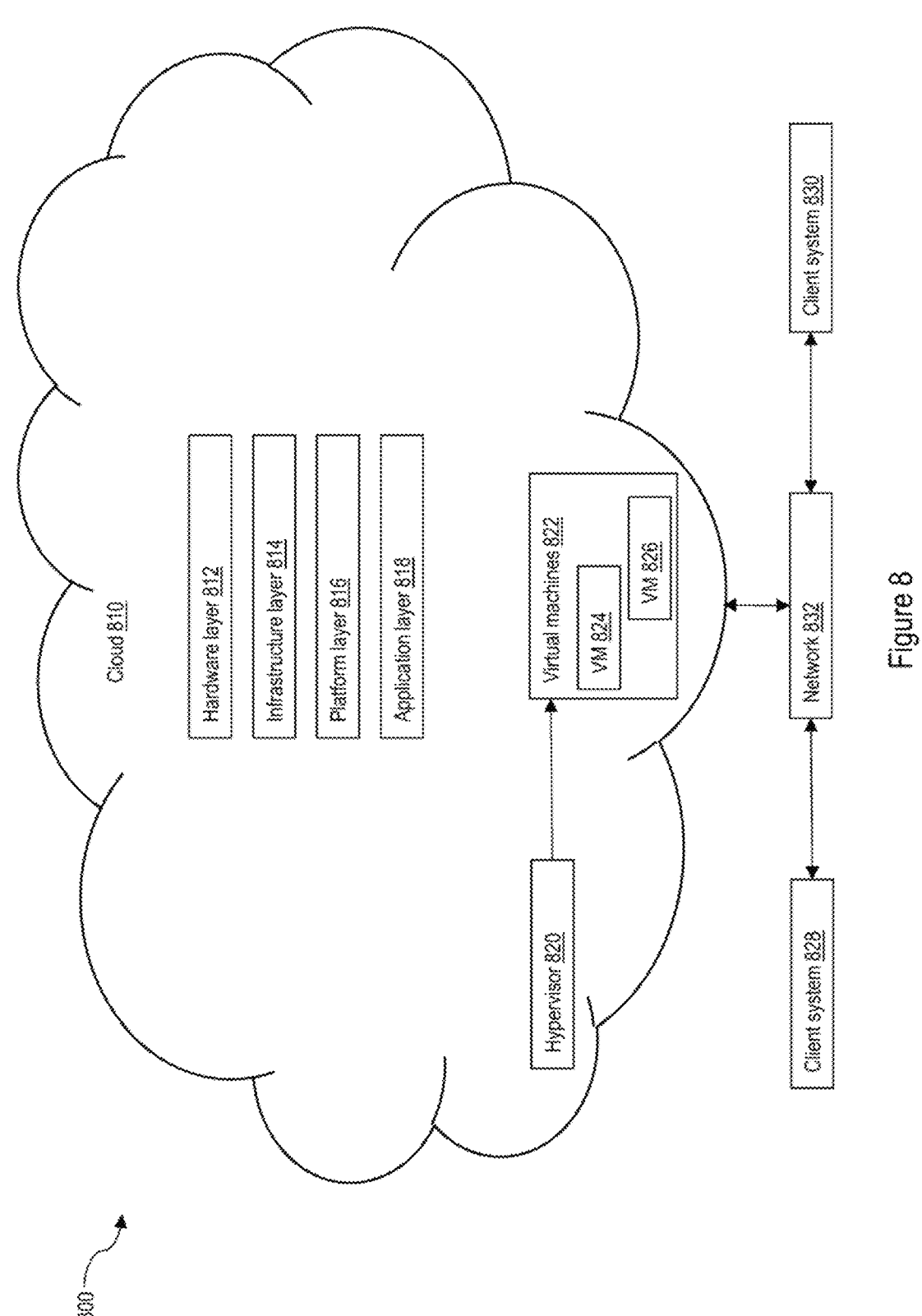
FIG. 8 is a schematic diagram of a cloud environment of a network configuration for wildfire detection and prediction, according to an embodiment.

Referring now to FIG. 8, shown therein is a schematic diagram of a cloud environment 800 of a network configuration for wildfire detection and prediction, according to an embodiment. The cloud environment 800 may be configured for implementing the system 100 of FIG. 1, the system 600 of FIG. 6, the method 400 of FIG. 4, and/or the method 700 of FIG. 7.

The cloud environment 800 includes a cloud server 810. The cloud server 810 (or each of the different premises on the cloud server 810) includes a hardware layer 812, an infrastructure layer 814, a platform layer 816, and an application layer 818.

The exemplary cloud environment 800 provides computation, software, data access, and storage services that do not require end-user knowledge of the physical location or configuration of the system that delivers the services. In various embodiments, cloud computing delivers the services over a wide area network, such as the internet, using appropriate protocols.

For instance, cloud computing providers deliver applications over a wide area network to be accessed through a web browser or any other computing component. Software or components of the environment 800 as well as the corresponding data may be stored on servers at a remote location. The computing resources in a cloud computing environment may be consolidated at a remote data center location or may be dispersed. Cloud computing infrastructures may deliver services through shared data centers, even though they appear as a single point of access for the user. Thus, the components and functions described herein may be provided from a service provider at a remote location using a cloud computing environment. Alternatively, they may be provided from a conventional server, or they may be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud may be managed by a vendor and typically supports multiple consumers using the same infrastructure. Moreover, a public cloud, as opposed to a private cloud, may free up the end users from managing the hardware. A private cloud may be managed by the organization itself and the infrastructure is typically not shared with other organizations. The organization still maintains the hardware to some extent, such as installations and repairs, etc.

A hypervisor 820 may illustratively manage or supervise a set of virtual machines 822. The virtual machines 822 may include a plurality of different, independent, virtual machines 824-826. Each virtual machine 824, 826 may illustratively be an isolated software container that has an operating system and an application. The isolated software container may be illustratively decoupled from a host server by the hypervisor 820. In addition, the hypervisor 820 may spin up additional virtual machines or close virtual machines. The hypervisor 820 may, based upon workload or other processing unit, merge environmental data collected from sensors with additional criteria.

A plurality of different client systems 828-830 (which may be end user systems or administrator systems, or both) may illustratively access cloud server 810 over a network 832. Depending upon the type of service being used by each of the client systems 828-830, the cloud 810 may provide different levels of service. In an embodiment, users of the client systems are provided access to application software and databases. The cloud 810 manages the infrastructure and platforms that run the application. This may be referred to as software as a service (or SaaS). The software providers operate application software in application layer 818 and end users access the software through the different client systems 828-830.

The cloud provider may further use platform layer 816 to provide a platform as a service (PaaS). This includes an operating system, programming language execution environment, database, and webserver being provided to the client systems 828-830, as a service, from the cloud provider. Application developers may develop and run software applications on the platform layer 816 and the provider of the cloud 810 manages the underlying hardware layer 812, infrastructure layer 814, and application layer 818.

The cloud provider may further use the infrastructure layer 814 to provide infrastructure as a service (IaaS). In such a service, physical or virtual machines and other resources are provided by the cloud provider, as a service. These resources are provided, on-demand, by the IaaS cloud provider, from large pools installed to form merged datacenters. In order to deploy applications, the cloud users that use IaaS install operating-system images and application software on the cloud environment 800.

Computer readable storage mediums, as described herein, may be a tangible device that retains and stores instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk™, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to exploit features of the present disclosure.

Embodiments and features of the subject disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, devices, and computer program products according to various embodiments of the subject disclosure.

In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The detailed description provided above in connection with the appended drawings explicitly describes and supports various features of a system, method, and device for early wildfire detection. By way of illustration and not limitation, supported embodiments include a machine learning apparatus for predicting whether wildfires will occur in a geographic area including a plurality of data collecting devices connecting to a network with each of the plurality of data collecting devices having a plurality of sensors for collecting environmental data thereon and a server receiving the environmental data including historical environmental data and real-time environmental data and location data correlating to the location of each of the plurality of data collecting devices from the plurality of data collecting devices over the network; the server including memory having computer readable instructions and a processor for executing the computer readable instructions, the computer readable instructions including instructions for collecting, over the network, the environmental data and the location data from the plurality of data collecting devices populating a map of the geographic area with the location data and the environmental data receiving weather data over the network determining the probability that a wildfire will occur at a plurality of locations within the geographic area from the historical environmental data, the location data, and the weather data determining whether an anomaly has occurred at each of the plurality of locations within the geographic area from the real-time environmental data and generating output related to at least one of a location on the map, the probability that a wildfire will occur, and whether an anomaly has occurred.

Supported embodiments include the foregoing machine learning apparatus, wherein the plurality of sensors include sensors selected from the group consisting of carbon monoxide sensors, carbon dioxide sensors, nitrogen dioxide sensors, temperature sensors, and humidity sensors.

Supported embodiments include any of the foregoing machine learning apparatus, wherein the weather data includes weather data selected from the group consisting of wind data, temperature data, precipitation data, and sunshine intensity data.

Supported embodiments include any of the foregoing machine learning apparatus, the computer readable instructions including instructions for receiving vegetation data and fire history data over the network and combining the historical environmental data, the location data, the weather data, the vegetation data, and the fire history data to determine the probability that a wildfire will occur at a plurality of locations within the geographic area.

Supported embodiments include any of the foregoing machine learning apparatus, the computer readable instructions including instructions for dividing the map into smaller portions to form a pixelated map aggregating sensor data from the environmental data and the location data; and populating the pixelated map with the sensor data for each of the plurality of sensors being correlated to the location of each sensor within the plurality of sensors.

Supported embodiments include any of the foregoing machine learning apparatus, the computer readable instructions including instructions for determining the probability that a wildfire will occur at a location corresponding to a pixel within the pixelated map.

Supported embodiments include any of the foregoing machine learning apparatus, the computer readable instructions including instructions for sending the output to a display device for display thereon.

Supported embodiments include a device, a system, a method, a computer-readable storage medium, a computer program product and/or means for implementing any of the foregoing apparatus or portions thereof.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

The invention claimed is:

1. A detection and prediction system comprising:
a plurality of data collecting devices configured to connect to a wildfire detection network, wherein the data collecting devices automatically select a network protocol from a plurality of network protocols based on a location of the data collecting devices and/or a received network protocol received from another of the data collecting devices; and
a network server for:
    receiving environmental data from the plurality of data collecting devices, wherein the environmental data includes location data, historical environmental data, and real-time environmental data;
    populating a map of a geographic area in which the plurality of data collecting devices are disposed;
    receiving weather data through the wildfire detection network;
    determining a probability of a wildfire at a plurality of locations within the geographic area from the environmental data and the weather data; and
    determining whether an anomaly has occurred within the geographic area based on the real-time environmental data;
wherein the network server is further configured to:
    divide the map into smaller portions to form a pixelated map;
    aggregate sensor data from the environmental data and the location data;
    populate the pixelated map with the sensor data, wherein the sensor data for the plurality of sensors is correlated to the location of the sensors within the plurality of sensors; and
    determine the probability of the wildfire at the location corresponding to a pixel within the pixelated map.

2. The detection and prediction system of claim 1, wherein the data collecting device includes a sensor assembly, wherein the sensor assembly includes a plurality of sensors configured to detect the environmental data, the environmental data relating to any one or more of carbon dioxide, carbon monoxide, nitrogen dioxide, temperature, and humidity, and wherein the sensor assembly includes a filter configured to improve measurement accuracy, the filter configured as any one or more of a bandpass filter, a neutral density filter, a chemical filter, and a particulate filter, and wherein the weather data includes at least one of wind data, temperature data, precipitation data, and sunshine intensity data.

3. The detection and prediction system of claim 1, wherein the environmental data and the weather data are processed according to an algorithm implemented in a graph neural network, the graph neural network including a historical data processing layer, a real-time data processing layer, an external data processing layer, and a multivariate mapping and anomaly detection layer.

4. The detection and prediction system of claim 1, wherein the network server is further configured to:
receive vegetation data and fire history data over the network; and
combine the historical environmental data, the location data, the weather data, the vegetation data, and the fire history data to determine the probability of the wildfire for the plurality of locations within the geographic area.

5. The detection and prediction system of claim 1 further comprising:
at least one network gateway configured to provide a communication interoperability interface between the plurality of network protocols;
a network server for providing network services including data processing, storage, application and device management, and resource sharing, the network server connected to the at least one network gateway;
wherein the plurality of network protocols includes any one or more of a LoRa (Long Range) network protocol and a LoRaWAN (Long Range Wide Area Network) network protocol, and wherein the environmental data relates to the presence or absence of a wildfire.

6. The detection and prediction system of claim 5, wherein the plurality of data collecting devices and the at least one network gateway are configured to transmit data in a time synchronization, wherein the time synchronization includes any one or more of duty cycling, time-slotted communication, coordinated sensing, power-efficient routing, and reduced idle listening.

7. The detection and prediction system of claim 1, wherein the data collecting device includes a wireless communication module, and wherein the wireless communication module is configured to operate in any one of a plurality of operation modes including a LoRa end-node, a LoRaWAN end-node, a LoRa repeater mode, and a LoRa to LoRaWAN mode based on the received network protocol of the other data collecting device.

8. The detection and prediction system of claim 1, wherein the data collecting device includes a power supply assembly configured to provide electrical power to the data collecting device, the power supply assembly including a power source and a power management circuit, wherein the power source includes a rechargeable battery and a non-rechargeable battery, the rechargeable battery serves as a first power source until an energy level of the rechargeable battery reaches a predetermined limit according to the power management circuit, and the non-rechargeable battery serves as a second power source when the energy level is at the predetermined limit.

9. A detection and prediction method, the method comprising:
receiving environmental data from a plurality of data collecting devices configured to connect to a wildfire detection network, wherein the environmental data includes location data, historical environmental data, and real-time environmental data;
populating a map of a geographic area in which the plurality of data collecting devices are disposed;
receiving weather data through the wildfire detection network;
determining a probability of a wildfire at a plurality of locations within the geographic area from the environmental data and the weather data;
determining whether an anomaly has occurred within the geographic area from the real-time environmental data;

dividing the map into smaller portions to form a pixelated map;

aggregating sensor data from the environmental data and the location data;

populating the pixelated map with the sensor data, wherein the sensor data for the plurality of sensors is correlated to the location of the sensors within the plurality of sensors;

determining the probability of the wildfire at the location corresponding to a pixel within the pixelated map; and selecting automatically, by the data collecting devices, a network protocol from a plurality of network protocols based on a location of the data collecting devices and/or a received network protocol received from another data collecting device.

10. The detection and prediction method of claim 9, wherein the data collecting device includes a sensor assembly, wherein the sensor assembly includes a plurality of sensors configured to detect the environmental data, the environmental data relating to any one or more of carbon dioxide, carbon monoxide, nitrogen dioxide, temperature, and humidity, and wherein the sensor assembly includes a filter configured to improve measurement accuracy, the filter configured as any one or more of a bandpass filter, a neutral density filter, a chemical filter, and a particulate filter, and wherein the weather data includes at least one of wind data, temperature data, precipitation data, and sunshine intensity data.

11. The detection and prediction method of claim 9, wherein the environmental data and the weather data are processed according to an algorithm implemented in a graph neural network, the graph neural network including a historical data processing layer, a real-time data processing layer, an external data processing layer, and a multivariate mapping and anomaly detection layer.

12. The detection and prediction method of claim 9, wherein the method further comprises:

receiving vegetation data and fire history data over the network; and combining the historical environmental data, the location data, the weather data, the vegetation data, and the fire history data to determine the probability of the wildfire for the plurality of locations within the geographic area.

13. The detection and prediction method of claim 9, wherein the method further includes transmitting data in a time synchronization, wherein the time synchronization includes any one or more of duty cycling, time-slotted communication, coordinated sensing, power-efficient routing, and reduced idle listening.

14. The detection and prediction method of claim 9, wherein the plurality of network protocols includes any one or more of a LoRa (Long Range) network protocol and a LoRaWAN (Long Range Wide Area Network) network protocol, wherein the environmental data relates to the presence or absence of a wildfire, and wherein the data collecting device includes a wireless communication module, and wherein the wireless communication module is configured to operate in any one of a plurality of operation modes including a LoRa end-node, a LoRaWAN end-node, a LoRa repeater mode, and a LoRa to LoRaWAN mode based on the received network protocol of the other data collecting device.

15. The detection and prediction method of claim 9, wherein the data collecting device includes a power supply assembly configured to provide electrical power to the data collecting device, the power supply assembly including a power source and a power management circuit, wherein the power source includes a rechargeable battery and a non-rechargeable battery, the rechargeable battery serves as a first power source until an energy level of the rechargeable battery reaches a predetermined limit according to the power management circuit, and the non-rechargeable battery serves as a second power source when the energy level is at the predetermined limit.

16. A network server for:

receiving environmental data from a plurality of data collecting devices configured to connect to a wildfire detection network, wherein the environmental data includes location data, historical environmental data, and real-time environmental data, wherein the data collecting devices automatically select a network protocol from a plurality of network protocols based on a location of the data collecting devices and/or a received network protocol received from another of the data collecting devices;

populating a map of a geographic area in which the plurality of data collecting devices are disposed;

receiving weather data through the wildfire detection network;

determining a probability of a wildfire at a plurality of locations within the geographic area from the environmental data and the weather data; and determining whether an anomaly has occurred within the geographic area based on the real-time environmental data-dividing the map into smaller portions to form a pixelated map;

aggregating sensor data from the environmental data and the location data;

populating the pixelated map with the sensor data, wherein the sensor data for the plurality of sensors is correlated to the location of the sensors within the plurality of sensors; and determining the probability of the wildfire at the location corresponding to a pixel within the pixelated map.

\* \* \* \* \*